United States Patent [19]

Tomaschke et al.

[11] Patent Number: 4,990,252

[45] Date of Patent: Feb. 5, 1991

[54] STABLE MEMBRANES FROM SULFONATED POLYARYLETHERS

[75] Inventors: John E. Tomaschke, San Diego, Calif.; Anthony J. Testa, Westwood; James G. Vouros, Boston, both of Mass.

[73] Assignee: Hydanautics, Goleta, Calif.

[21] Appl. No.: 397,346

[22] Filed: Aug. 22, 1989

Related U.S. Application Data

[63] Continuation of Ser. No. 10,865, Feb. 4, 1987, abandoned.

[51] Int. Cl.$^5$ .............................................. B01D 63/02
[52] U.S. Cl. ........................... 210/321.83; 210/490; 210/500.23; 210/500.39; 210/500.41; 422/246
[58] Field of Search ..................... 210/321.74, 321.76, 210/321.80, 321.85, 321.89, 321.83, 500.23, 500.39, 500.41, 487, 490, 494.1, 497.1; 427/246

[56] References Cited

U.S. PATENT DOCUMENTS

| | | | |
|---|---|---|---|
| 3,567,810 | 3/1971 | Baker | 210/500.41 |
| 3,709,841 | 1/1973 | Quentin | 428/213 |
| 3,875,096 | 4/1975 | Graefe et al. | 260/292 N |
| 3,994,860 | 11/1976 | Brousse | 210/500.41 |
| 4,038,351 | 7/1977 | Koenst | 210/500.41 |
| 4,054,707 | 10/1977 | Quentin | 260/2.2 |
| 4,073,724 | 2/1978 | Chapurlat | 210/500.41 |
| 4,230,463 | 10/1980 | Henis | 210/500.41 |
| 4,260,652 | 4/1981 | Taketani | 210/500.39 |
| 4,292,417 | 9/1981 | Ishii et al. | 525/510 |
| 4,307,135 | 12/1981 | Fox | 427/244 |
| 4,413,106 | 11/1983 | Coplan et al. | 525/534 |
| 4,476,022 | 10/1984 | Doll | 210/321.83 |
| 4,481,260 | 11/1984 | Nohmi | 210/500.41 |
| 4,508,852 | 4/1985 | Bikson et al. | 521/27 |
| 4,548,714 | 10/1985 | Kirwan | 210/321.83 |
| 4,612,119 | 9/1986 | Eguchi | 210/500.41 |
| 4,661,257 | 4/1987 | Kreevoy | 210/500.41 |

FOREIGN PATENT DOCUMENTS

| | | | |
|---|---|---|---|
| 5759686 | 5/1985 | Australia . | |
| 5782686 | 5/1986 | Australia . | |
| 5782786 | 5/1986 | Australia . | |
| 5782886 | 5/1986 | Australia . | |
| 0112724 | 7/1984 | European Pat. Off. | 210/500.39 |
| 0142973 | 5/1985 | European Pat. Off. | 210/500.41 |
| 0237251 | 9/1987 | European Pat. Off. | 210/500.39 |
| 0202849 | 1/1988 | European Pat. Off. | 210/500.39 |
| 0165077 | 7/1988 | European Pat. Off. | 210/500.39 |
| 2252862 | 6/1975 | France | 210/500.39 |
| 1463175 | 2/1977 | United Kingdom | 210/500.39 |
| 1473857 | 5/1977 | United Kingdom | 210/500.39 |
| 1495887 | 12/1977 | United Kingdom | 210/500.39 |

OTHER PUBLICATIONS

Abstract, vol. 11, No. 63 (C-406) [2510], Feb. 26, 1987 (61-222503 (A)), Abstract of Japan Patent 61-22250-3(A).

"Synthesis and Transport Properties of Thin Film Composite Membranes, II, Preparation of Sulfonated . . . ", Journal of Applied Polymer Science, vol. 29, 4029-4035 (1984).

U.S. Govt. Grant Contract 14-34-0001-9404-12/19-80-Lloyd et al.

U.S. Govt. Grant Contract 14-34-0001-9531-11/19-80-Schiffer et al.

U.S. Govt. Grant Contract 14-34-0001-7510-5/1979--Graefe et al.

U.S. Govt. Grant Contract 14-34-0001-7541-2/1979--Graefe.

U.S. Govt. Grant Contract 14-30-2627-6/1971-Chludzinski et al.

*Primary Examiner*—Ernest G. Therkorn
*Attorney, Agent, or Firm*—Sughrue, Mion, Zinn, Macpeak & Seas

[57] ABSTRACT

The invention provides a novel thin film composite or coated membrane suitable for reverse osmosis, ultrafiltration and microfiltration applications, and having a porous polymeric substrate with one or more microporous layers to which a thin film or coating comprising a sulfonated polyarylether is attached substantively to provide an oxidatively stable, thin hydrophilic film or coating layer, and a method for manufacturing and using the same.

16 Claims, No Drawings

STABLE MEMBRANES FROM SULFONATED POLYARYLETHERS

This is a Continuation of application Ser. No. 07/010,865 filed Feb. 4, 1987, now abandoned.

BACKGROUND OF THE INVENTION

1. Field of the Invention

The present invention relates to composite or coated sulfonated poly(arylether) membranes for reverse osmosis ("RO"), ultrafiltration ("UF") and microfiltration ("MF") made by a novel process and their method of use.

2. Description of the Prior Art

The present commercially available membranes for water desalination by reverse osmosis are derived from two basic classes of polymers: cellulosic (predominantly cellulose acetates) and the newer generation condensation products consisting of polyamides, polyamidohydrazides, polyureas and polyetherureas. The cellulosic membranes are susceptible to microbiological attack, compaction at higher temperatures and pressures, and are limited to a relatively narrow feed pH range. These membranes do, however, possess fairly good resistance to low levels of chlorine, a popular disinfectant and cleaning chemical used in water desalination and other separation processes. The second group of polymers (which are suitable for ultrafiltration as well as RO) in general exhibit improved transport properties at given applied pressures and stability over a wider range of pH compared to the cellulosic membranes. Unfortunately, all of these membranes made from the newer generation of polymers suffer from poor resistance to continual exposure to oxidizing agents such as chlorine in a RO application. This "tradeoff" in sensitivities results in economically disadvantageous chlorine removal in many common feed streams or loss of membrane permselectivity due to oxidative degradation. Thus, this kind of sensitivity limits or even prevents their use in potable water applications and especially food and beverage, medical, biochemical, and pharmaceutical applications where chlorination and other similar oxidative cleaners or sterilants are commonly employed.

In recent years polysulfone type polymers have been extensively used in the manufacture of ultrafiltration membranes for use in many applications because of excellent hydrolytic stability and high temperature properties. The polysulfone polymers that are commercially available today, UDEL ® polysulfone manufactued by Union Carbide Corp. and Victrex ® polyethersulfone manufactured by ICI, also possess acceptable chlorine resistance when exposed periodically during cleaning. Therefore, these polysulfone type polymers are extensively used for membrane applications in the dairy and food processing areas that require daily sanitizations with chlorine and high temperature membrane cleaning regimens of 1% caustic and 1% phosphoric acid. Polysulfone type membranes have also found extensive use in pharmaceutical and biotechnology application areas and perform very well under most circumstances.

In recent years, sulfonated polyarylethers, and particularly sulfonated polyarylether sulfones have been examined for membrane separation applications due to their outstanding chemical and thermal stability. In addition to demonstrating good RO membrane flux and salt rejections at pressures greater than 300 psig, these membranes have demonstrated the ability to operate at continuous chlorine exposure levels and pH extremes that would destroy both of the previously mentioned classes of polymer membranes. Thus the chlorine tolerance and hydrolytic stability of the sulfonated polyarylethers would, at first blush, appear to make them particularly well suited for desalination of a wide range of aggressive feed streams represented by such conditions ranging from natural brackish waters, industrial effluents, sewage effluents, mining waters, agricultural run-off, etc. and many applications other than water desalination and water recovery mentioned previously.

The problem with these membranes has been their inability to achieve commercially attractive fluxes and salt rejections reproducibly at economical applied pressures. Acceptable performance for brackish water (low pressure RO) desalination would typically be: at least 15 GFD (gallons/ft$^2$-day) water flux and 95% or better salt rejection (5% or less salt passage) at 200 psig net driving pressure (NDP) or alternatively, an equitable tradeoff in these properties. Consistent with the principles of reverse osmosis, higher applied pressures will give higher flux and salt rejection, but at a penalty of added power cost for the extra pressure. It is therefore desirable to develop membranes which produce adequate flux and salt rejections at lower applied pressures.

The prior art involving sulfonated polyarylether membranes reveals that in order to obtain the desired transport properties on brackish (2000–5000 ppm NaCl) feeds of 15 or more GFD flux and 95% or better salt rejection, applied pressures of 300–600 psig or even more had to be used. The predominant membrane types developed were asymmetric, and consisted of thick (1–20 mil) anisotropic structures in which the permselectivity occurs at the thin dense film top side of this structure. The thin top film is integral with and supported by a progressively more porous understructure. Better results were found with thin film composite membranes in which selected laboratory samples developed by Graefe, et al (Office of Water Research and Technology, Report No. 2001-20) achieved low pressure goal performance at 250 psig (32 GFD flux and 94.5% salt rejection). This latter membrane example consisted of a thin film laminate prepared by brush coating a solution of sulfonated polysulfone onto a porous polysulfone substrate which was pretreated with aqueous lactic acid. The purpose for the latter solution was claimed to prevent intrusion of the sulfonated polysulfone solution into the pores of the porous substrate. This thin film composite membrane while demonstrating potential, suffered from an awkward porous substrate pretreatment step and lack of performance reproductibility and never reached commercialization.

One such thin film composite membrane which was carried further in its development was the hollow fiber composite system developed by Schiffer, et al. This membrane was prepared by coating an alcoholic solution of a highly sulfonated polysulfone (free acid form) onto a porous hollow-fiber polysulfone substrate. The thin film was claimed to have been crosslinked via the thermal treatment applied after solution deposition, though no proof of this was actually given. Performance was modest—at 6 GFD flux and up to 95% salt rejection on a 3500 ppm NaCl feed at 400 psig applied pressure. Problems with this membrane included inherent fragility of the coated fibers and ultimately inconsistent performance results on test in the full scale element mode.

The vast majority of prior art sulfonated polyarylether membranes has consisted of either (impractical) laboratory scale, thick dense films or asymmetric structures. These types of structures have been incapable of providing at least 15 GFD flux with 95% salt rejection at economical applied pressures (under 400 psig) as required for RO applications. As a result, some researchers investigated thin film composite membrane designs, since this approach if carried out optimally yields maximum fluxes in conjunction with good salt rejections. This is consistent not only with theory but also with other known membrane structures in operation today. The limitations with prior art thin film composites rested with the techniques of fabrication and the polymer choices used.

SUMMARY OF THE INVENTION

In contrast to the results of the prior art, it has now been discovered that superior sulfonated polyarylether permselective membranes can be produced by deposition of particular solutions of these polymers directly onto porous polymer substrates. This novel process is optimally carried out without the need for precoating the porous support or crosslinking the nascent thin film or coating. It has further been found that many heretofore unexplored combinations of thin film barrier polymers and porous support polymers are possible, in fact—judicious combinations have proven optimal in the development of these thin film composite permselective membranes.

More specifically, thin film composite (or coated) reverse osmosis, ultrafiltration and microfiltration membranes are prepared from sulfonated polyarylethers with an ion exchange capacity (IEC) of 0.2 to 2.9 meq./gm., preferably 0.2 to 2.0 meq./gm., by a convenient one-step solution deposition onto porous polymer substrates. Polar solvents of medium to strong hydrogen-bonding ability, reasonable volatility, and low enough surface tension to wet the porous substrates are required. The optional addition of alkali metal salts, particularly lithium salts, to the coating formulation has normally been shown to dramatically increase water permeability of the resultant membranes. The deposition of said solutions of sulfonated polyarylethers (SP's) in the amount of 10–100 mg SP/ft$^2$ of porous substrate followed by solvent evaporation yields composite or coated membranes with excellent permselectivity, toughness, and chemical resistance. These membranes are suitable for applications ranging from high pressure to low pressure reverse osmosis (RO) (e.g., sea water to brackish water applications) to ultrafiltration (UF) and microfiltration (MF) applications including desalination, food and beverage, pulp and paper, metal liquor, pharmaceutical, electronics, water softening, medical, RO pretreatment, and non-aqueous applications.

The process consists of uniformly "coating" a dry or wet porous polymeric membrane substrate with a solution of a sulfonated polyarylether containing its sulfonic acid groups in the free acid form or salt form in a good solvent, or a mixture of liquids creating a good solvent, containing the requisite amount of a flux enhancing additive, then removing the bulk of the solvents by heating to yield a thin film composite or coated membrane. The solvent system, either as a singular liquid or as a mixture of liquids, is substantially polar, reasonably volatile, of low enough surface tension to wet the dry porous substrate, and, though possibly capable of swelling the porous substrate polymer, is not able to dissolve it. The selection of an improved solvent system for the sulfonated polyarylethers is an important and novel aspect of this invention. Effective coating has been demonstrated with a variety of controlled liquid application methods commonly employed in the coating/converting industry. The resultant sulfonated polyarylether thin film, while not chemically reacted with the porous substrate polymer, is remarkably well adhered to it and yields a tough, permanent and adherent layer that consistently survives both the chemical and mechanical rigors of realistic test conditions. Reverse osmosis membranes prepared in this way exhibit excellent fluxes and salt rejections, with uniquely high resistance to chlorine and other harsh cleansers commonly used for membrane separation applications. Ultrafiltration and microfiltration membranes prepared in this way have improved (1) fouling resistance, (2) oxidative stability, and (3) pore size distribution.

A high performance UF membrane having a porous anisotropic substrate polymer membrane and a thin coating of sulfonated polyarylether may also be produced according to the process of this invention.

Unlike the dense salt rejecting layer needed for RO, with the UF, MF and low pressure RO membranes the sulfonated polyarylether coating must itself be sufficiently porous to allow control of the desired molecular weight cutoff or salt rejection in the case of low pressure RO membranes. The substrate in a coated UF membrane of the invention will usually have a lower molecular weight cutoff (tighter) after coating than before, and accordingly, a suitable UF substrate will usually be selected from more "open" (higher MW cutoff) UF membranes than those which are desired to be produced. The molecular weight cutoff of the coated UF membranes of this invention can be controlled in one of two ways. First, the molecular weight cutoff of the membrane can be controlled by adjusting the formulation of the coating solution or adjusting the coating curing cycle. Second, the molecular weight cutoff can be controlled by depositing the coating solution on UF or MF membranes with different pore size distributions. Using this latter approach, the coated UF membrane will normally exhibit a lower molecular weight cutoff (tighter membrane) than the UF membrane support. One possible exception to this is when the coating is extremely light, such as when the purpose of the coating is to change only the hydrophilic nature of a polymeric substrate membrane. Sulfonated polyarylether sulfone or sulfonated polysulfone coating solutions can be deposited preferably on polysulfone or polyethersulfone UF membranes to provide a series of composite UF membranes with closely controlled molecular weight cutoffs.

Although we do not wish to be bound to any theory expressed herein, it can be postulated that the RO membranes have a continuous film coating free of large pores to allow diffusion of water while rejecting salts whereas in UF and MF membranes the sulfonated polyarylether layer should only coat the surface of the membrane without substantially filling in, or coating over, the original pores in the polymeric membrane substrate. Although direct proof of the correctness of this belief is lacking, it may be helpful in understanding the present invention to consider the RO-type membranes as true composite membranes with a continuous gel polymer film (barrier layer) at the surface of a porous membrane substrate, whereas the UF membranes may be thought of as being porous UF membranes with a light coating of the sulfonated polyarylether polymer conforming to the original geometry of the substrate (restricting, but not completely coating over the pores). As used herein, the term "composite" is mainly intended to relate to high pressure RO membranes of the invention (useful for desalinating sea water or the like) and the term "coated" relates mainly to low pressure RO, UF, and MF membranes of the invention, except where otherwise the terms are used in a more generic sense.

DETAILED DESCRIPTION

It has now been found that thin film composite membranes with superior flux and rejection properties can be fabricated by a solution deposition process utilizing sulfonated polyarylether polymers containing a specific range of sulfonation content together with selected solvent systems and porous polymeric substrates.

The polyarylethers useful in the practice of this invention are aromatic polymers lacking oxidatively unstable linkages in the main chain and of sufficient molecular weight for good film forming behavior. These belong to three different basic structural types as represented by the formulae below:

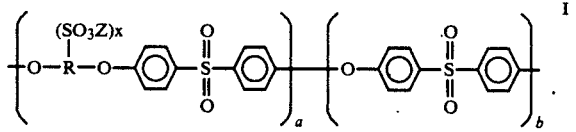

in which R is an aromatic radical chosen from the following:

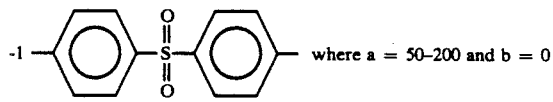 where a = 50–200 and b = 0

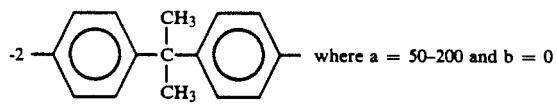 where a = 50–200 and b = 0

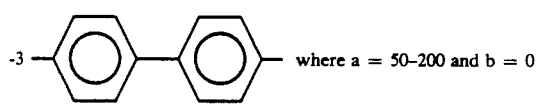 where a = 50–200 and b = 0

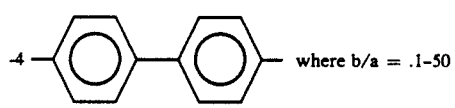 where b/a = .1–50

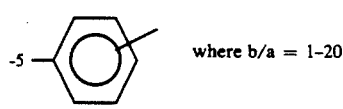 where b/a = 1–20

 where a = 50–200 and b = 0

-7 Any combination of the above radicals and additionally those not shown above that are derived from commercially available dihydroxy aromatic monomers capable of reacting with a dihalodiphenyl sulfone monomer to form a polyarylether sulfone.

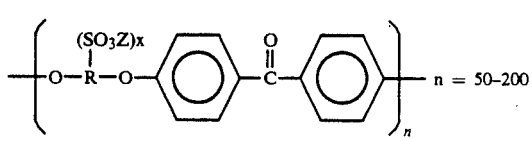 n = 50–200 in which R is an aromatic radical chosen from the following:

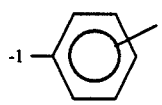

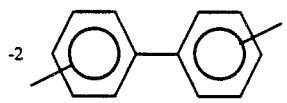

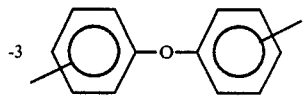

-4 Any combination of the above radicals and alternatively, those not shown above that are derived from commercially available dihydroxy aromatic monomers capable of reacting with a dihalodiphenyl ketone monomer to form a polyarylether ketone.

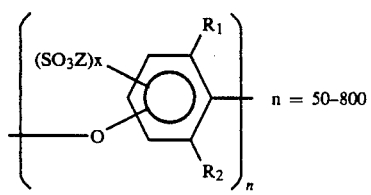 n = 50–800 in which $R_1$ and $R_2$ are hydrogen, or alkyl radicals, thus specifically:

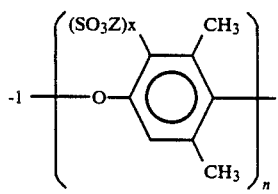

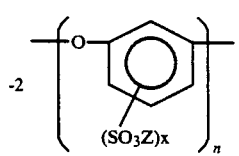

$SO_3Z$ refers to the sulfonic acid group which is introduced into the fully synthesized polymer by methods commonly practiced for aromatic polymer sulfonations. The position of this group, consistent with electophilic aromatic substitution, is predominantly ortho to the activating ether linkage for all polymer types shown. Z may be hydrogen in the case of free acid, an alkali metal salt, or a nitrogen containing salt derived from ammonia or amines. The value for x, which is the number of sulfonic acid residues per polymer repeat unit, will vary for each polymer example and can be calculated from the ion exchange capacity (I.E.C. expressed as milliequivalents of sulfonic acid residues per gram of sulfonated polymer). The latter is determined analytically from sulfur contents found with each sulfonated polymer. The useful sulfonic acid content range is found to be different for each individual polymer type, but in general is very similar for polymers within the same structural formula class as shown in Formulae I, II, and III.

The average IEC requirement for membranes of this invention becomes greater as one compares polymers of class I through III, and this is believed to be due to corresponding decreases in hydrophilicity in the unsulfonated starting polymer. Thus while polyarylether sulfones of class I are effective with an IEC range of about 0.3 to 2.2 meq./gram, polyphenylene oxides of class III must usually be in the range of about 1.3 to 2.9 meq./gram. There are two requirements of the polymers used in the present invention with respect to sulfonic acid content. The first requirement is that these polymers be soluble in the preferred solvents of the invention and yet not be appreciably soluble in a membrane test feed—such as saline water. The ranges of IEC given above correspond to the minimum degree of sulfonation for solubility in the preferred solvents and maximum allowable degree of sulfonation for stability in aqueous environments, respectively. It is pointed out that as these polymers become gradually more sulfonated they progress from solubility in solvents of low to moderate polarity and hydrogen bonding ability to ones with moderate to high values, and ultimately to solubility in water.

The second requirement is that the IEC be that which yields the best combination of membrane flux and rejection performance for the particular separation application. Fortunately, this is nearly always found to be near the center of the broad ranges specified. It is generally found in practice that higher membrane IEC values lead to higher water permeability with proportionately higher solute passage and conversely, lower membrane IEC values lead to lower water permeability with proportionately lower solute passage (higher rejection). Thus it is possible to tailor the performance of composite RO membranes by optimizing the degree of sulfonation of the polyarylether thin film polymer to narrow ranges of IEC.

The criteria for the solvent system employed in the coating process is that it must be a good solvent for the sulfonated polyarylether, a nonsolvent for the porous substrate, of low enough surface tension to wet the porous substrate, and volatile enough to be removed by gentle heating. The fact that the sulfonated polyarylethers and the porous substrate polymers may be very similar chemically may limit the number of effective solvents, though investigation of solubility parameters for both polymers has uncovered several viable types. The present invention resides largely in the finding that the membrane properties of sulfonated polyarylethers can be surprisingly enhanced when applied to a substrate from a particular novel, potentiating solvent system. The membranes made according to this invention thus have a combination of improved flux/rejection when compared to sulfonated polyarylether membranes prepared heretofore using the conventional solvents and solvent systems. Accordingly, as used herein and in the appended claims, the expression "potentiating solvent system" is intended to describe novel solvents and solvent mixtures heretofore unknown for sulfonated polyarylether coatings and which unexpectedly produce membranes of improved rejection and/or flux qualities.

Foremost among the potentiating solvent systems are those comprising significant amounts of formic acid, that is about 10% to 100% formic acid, with the remainder being cosolvents and flux-enhancing additives, etc. More preferred are solvent mixtures containing at least 20% formic acid. Additional solvents and solvent mixtures found to enhance sulfonated polyarylether membrane properties include formamide and formamide-containing mixtures such as formamide/2-methoxyethanol and formamide/formic acid. Solvents which ordinarily would not be useful for casting sulfonated polyarylethers on a conventional polymeric substrate membrane because of either their tendency to dissolve the substrate, or their inability to dissolve the sulfonated polyarylether because of poor solvent ability, such as acetone and acetonitrile respectively, can be used in combinations with other solvents, such as water, to form satisfactory membranes by the process of the invention. Thus, mixtures of acetonitrile/water (95%/5%) and acetone/water (75%/25%) have been shown to produce acceptable composite membranes on open polymeric membrane substrates.

The solubility parameter approach, particularly the three-dimensional system proposed by Hansen has been used effectively in predicting liquid miscibility and polymer solubility in some instances. This three-dimensional system assumes that the total cohesive energy which holds a liquid together (E) can be divided into contributions from dispersion (London) forces, $E_d$; permanent dipole-dipole forces, $E_p$; and hydrogen bonding forces $E_h$. Hansen's equation is as follows:

$$\delta_t^2 = \delta_d^2 + \delta_p^2 + \delta_h^2$$

where
$\delta d = (E_d/V)^{\frac{1}{2}}$
$\delta p = (E_p/V)^{\frac{1}{2}}$
$\delta h = (E_h/V)^{\frac{1}{2}}$ and V = molar volume of the solvent.

Table I below shows the total and component solubility parameters as well as other physical data for two sulfonated polyarylethers, a porous substrate polymer (polysulfone), and solvent systems which are compatible with the porous substrate polymer. The primary differences between sulfonated polymers I-2 and I-5 and polysulfone parameter values are found with the $\delta h$ and $\delta p$ components due to sulfonic acid function and decreased hydrocarbon character of the former. Water, a non-solvent which has a very high value for the $\delta h$ component, is added to other non-solvents (for sulfonated polyarylethers) such as acetonitrile and acetone, whose $\delta h$ components are small (3.0 and 3.4, respectively) in order to produce good solvents.

Experiments have shown that the high boiling formamide solvent is incapable of producing thin film RO composite membranes with high salt rejection, and this is believed to be due to a combination of excessive surface tension and high boiling point of this liquid. Formamide can be employed however, in smaller amounts with other solvents. 2-methoxyethanol, a weaker SP solvent, often requires the addition of 5% or more formamide or at least 20% formic acid for adequate solvency and even greater percentages of the latter for high RO membrane salt rejection. Addition of water to this solvent doesn't improve SP solubility, presumably due to an imbalance in resultant $\delta p$ and $\delta h$ component values. Addition of increasing water contents to such systems such as formic acid, acetonitrile, and acetone produce a trade-off in resultant membrane performance, amounting to higher fluxes and proportionately lower salt rejections. It has been found that, in general, any strongly-hydrogen bonding substance when added to the coating solution produces this behavior. This allows another dimension in tailoring formulations to meet various desired water permeability-permselectivity goals.

It is important to note that the solvent systems for SP's shown in Table I have been observed to swell a porous polysulfone RO substrate polymer without actually damaging it, and although this invention isn't limited by theory, it is theorized that this behavior leads to desirable entanglement of the thin film and porous substrate polymers in the composite RO membranes of the invention. It is further deduced that this expected phenomenon accounts for the remarkable adhesion and durability of these thin film composites. Formic acid has been found to be an extremely effective solvent for the practice of this invention and is thus preferred. The power of this solvent is believed to be the result of not only a good solubility parameter profile, but also the result of its small size and ionizing ability. Also advantageous are (1) the ability of this solvent to swell a porous polymeric substrate without harming it and (2) relative ease of evaporation (b.p.=101° C.).

A demonstration of the swelling action of formic acid on typical anisotropic polysulfone substrates used for SP membrane fabrication is illustrated below in Tables A and B. Included in these tables are comparisons with 2-methoxyethanol (ethylene glycol monomethyl ether) which has been used by others in SP membrane fabrication but which by itself is not as effective as formic acid. As seen in Table A, formic acid yielded 50% greater substrate water flux than the control (isopropanol/water) treatment whereas 2-methoxyethanol yielded virtually the same water flux as the control. Table B indicates even more dramatically the differences between solvents. Here polysulfone membrane substrates were coated with solvents and dried using the same technique employed during SP membrane fabrication. Testing of these relatively hydropbobic polysulfone substrates was performed by first rewetting briefly at 400 psig, then lowering to 223 psig at which pressure water fluxes were taken. The formic acid coated example yielded 23% greater water flux than the control whereas the 2-methoxyethanol case produced approximately half the control flux.

TABLE A

Water Flux Rates of Polysulfone Membrane Substrates Soaked in Different Solvents Then Finally Equilibrated in Water

| Solvent Treatment | Relative Flux Rate @ 55 psig |
|---|---|
| 50:50 Isopropanol/Water (Control) | 100 |
| Formic Acid | 150 |
| 2-methoxyethanol | 95.6 |

TABLE B

Water Flux Rates of Polysulfone Membrane Substrates Surface Coated with Different Solvents, Dried 3 Minutes @ 55° C., Rewet with Water @ 400 psig

| Treatment | Relative Flux Rate @ 223 psig |
|---|---|
| None (control) | 100 |
| Formic Acid | 123 |
| 2-methoxyethanol | 47.2 |

There is, in addition to the strongly hydrogen bonding liquids just mentioned, a wide variety of compounds, consisting of alkali metal salts, organic acids, and organic nitrogen containing compounds which are extremely potent in their ability to increase water permeability of the SP membranes. While many such compounds are effective, lithium chloride is preferred due to its potency in maximizing water flux of SP membranes at very little penalty to salt rejection. Although this invention is not limited by any theory, it is theoretically possible that lithium ion with its large hydration per size ratio is able to retain maximal water contents whether as the counter ion of the polymer sulfonic acid and/or simply as bulk salt (hygroscopic) residue distributed throughout the thin film of an RO composite membrane. The amount of lithium chloride incorporated into the coating solution formulation is dependent on the particular SP polymer being used, which is ultimately dictated by the desired combination of membrane flux and rejection performance.

Solubility parameter data for some typical solvents and non-solvents for the SP's used by the present invention are set forth in the following Table.

TABLE 1

SOLUBILITY PARAMETER DATA[2]

| Sulfonated Polyarylether (S.P.) | H-Bonding[5] Group | $\delta t$ | $\delta d$ | $\delta p$ | $\delta h$ | Surface Tension (dynes/cm) | Dipole Moment $u \times 10^{18}$ esu | Boiling Point (°C.) | Azeotropic Composition % Solvent/% $H_2O$ Boiling Points (°C.) |
|---|---|---|---|---|---|---|---|---|---|
| Polymer I-2[4] (IEC = .48 meq/g) | — | 11.8 | 8.6 | 5.9 | 5.4 | — | — | — | — |
| Polymer I-5 (IEC = 1.29 meq/g) | — | 12.8 | 8.4 | 7.4 | 6.1 | — | — | — | — |
| Porous Substrate Polymer | | | | | | | | | |
| Polysulfone[4] | — | 10.8 | 8.7 | 5.4 | 3.4 | — | — | — | — |
| Solvents for S.P.[1] (solubility parameter data for various solvents) | | | | | | | | | |
| Formamide | S | 17.9 | 8.4 | 12.8 | 9.3 | 58.2 | 3.25 | 211 | — |
| 50/50 Acetonitrile/Water* | (S) | 16.4 | 7.6 | 8.3 | 11.9 | 30.9 | — | — | 85.8/14.2, 76 |
| 50/50 Acetone/Water* | (S) | 15.7 | 7.6 | 6.5 | 12.1 | 30.4 | — | — | 88.5/11.5, 56.1 |
| Formic Acid | S | 12.2 | 7.0 | 5.8 | 8.1 | 37.6 | 1.52 | 101 | 77.5/22.5, 107 |
| 2-Methoxy ethanol | M | 12.1 | 7.9 | 4.5 | 8.0 | 30.5 | 1.5 | 125 | 22.2/77.8, 99.9 |
| Non-Solvents for S.P. | | | | | | | | | |
| Water | S | 23.4 | 7.6 | 7.8 | 20.7 | 72.8 | 1.82 | 100 | — |
| Acetonitrile | P | 12.0 | 7.5 | 8.8 | 3.0 | 29.3 | 3.84 | 82 | — |

TABLE 1-continued

SOLUBILITY PARAMETER DATA[2]

| Sulfonated Polyarylether (S.P.) | H-Bonding[5] Group | $\delta t$ | $\delta d$ | $\delta p$ | $\delta h$ | Surface Tension (dynes/cm) | Dipole Moment $u \times 10^{18}$ esu | Boiling Point (°C.) | Azeotropic Composition % Solvent/% $H_2O$ Boiling Points (°C.) |
|---|---|---|---|---|---|---|---|---|---|
| Acetone[3] | M | 9.8 | 7.6 | 5.1 | 3.4 | 23.7 | 2.89 | 56.5 | — |

*Estimated parameter values calculated from the expression: $\delta = \Sigma \phi \delta$ where $\phi$ = volume fraction and $\delta$ = solubility parameter of the components[2].
[1] Hansen, C. M., I & EC Product Research and Development (Volume 8, No. 1, March 1969), p. 2–11.
[2] Barton, A. F., Chemical Reviews, Vol. 75, No. 6, 1975, P. 731–751.
[3] Attacks polysulfone substrate.
[4] Data from Friedrich, et al, Desalination, 36, 1981, p. 39–62.
[5] S = strong; M = medium; P = poor.

It has been demonstrated that deposition of the SP solution onto the porous polymer substrate can be accomplished by a variety of controlled coating processes available from the converting industry. The amount of SP polymer deposited on the porous substrate should be as little as is needed for thin film strength and continuity in order to yield maximal water permeation with good solute rejections. In practice, this can be from 10 to 100 mg of SP polymer per square foot of porous substrate although the preferred loading is from 20 to 50 mg per square foot. Estimated thin film thickness for this loading is on the order of 2150–5400 Å (0.215–0.540 microns).

Laboratory scale coating of porous substrates to form RO composites has been performed conveniently by brushing on the SP solution, whereas continuous (moving web) coating (pilot scale production) has been demonstrated on more sophisticated machine processes, such as single and double roll bead, rod, and spray coaters. Subsequent to the solution deposition, a solvent removal step must be performed which yields an essentially dry, thin film composite. This consists of passing air at 0°–120° C. temperature and velocity of 0–3,000 feet/minute across the nascent thin film surface for a period of a few seconds to several minutes or even several hours. The solvent removal step is a critical one with respect to the final transport properties of the thin film composite RO membrane. The removal process is keyed to time, temperature, and velocity of the air applied, with greater values of these conditions yielding lower water permeability-higher permselectivity membranes, and lesser values yielding conversely higher water permeability/lower permselectivity membranes. For RO membranes, the preferred temperature and time range is 40°–80° C. and 0.5–10 minutes, respectively. The forced air velocity is less critical but can be used advantageously to compensate to some degree for lesser temperatures and/or times applied. It must be mentioned that other methods of heating such as infrared etc. with or without forced air have been investigated and found to be acceptable but less desirable than the preferred method.

Optional post treatments consisting of organic solvents and aqueous mixtures with or without thermal treatments can be given to the finished composite RO membrane for the purpose of improving permeability via swelling and/or hydration of the thin film. The post treatment may alternatively include further stabilization or "tightening" of the thin film polymer through ionic crosslinking or salt formation using solutions of multivalent metal salts, or through basic nitrogen containing compounds. Thermal treatments in aqueous media may be applied for the purpose of reordering the permselective barrier and thus further affecting membrane transport behavior. It should be understood that these post treatments are not normally required or performed but may be performed as an optional refinement step to achieve specific desired membrane performance.

The choice in porous substrate is governed by much of the same criteria applied to the SP polymer except that resistance to solvents for the substrate is required. Again it is preferable to utilize polymers with a high degree of resistance to chemical degradation-especially by oxidizing species such as chlorine, damage caused by wide ranges of pH, bacteria and enzymes, flow and creep under pressure, and certain organic solvents. As with any polymer application, tradeoffs in these properties exist and only careful consideration dictates the best choice of a specific porous substrate polymer. Examples of porous substrate polymers useful by the invention include but are not limited to: polyarylether sulfones, polyaryletherketones, polyphenylene ethers, polyphenylene thioethers, polyimides, polyetherimides, polybenzimidazoles, polyesters, polyvinylidene fluoride, polychloroethers, polycarbonates, polystyrene, polyvinylchlorides, polyacrylonitrile and various copolymers of the last three types, etc. Inorganic porous materials such as ceramics and metals may also be used as substrates in some specific instances. The preferred polymers for thin film composite membranes and for the coated UF membranes of this invention are polysulfone and polyarylether sulfones. These porous substrates may have surface pores of a size range of: 0.001–0.5 micron (1–500 nm), though the preferred range for RO and UF applications is from 0.001–0.03 microns (1–30 nm). The preferred sizes of pores are ideally small enough to prevent intrusion of the thin film SP solution, which would result in low permeability, and at the same time are adequately large for insignificant contribution to hydrodynamic resistance. A further problem with excessively large pores in RO applications is the inability to support the thin film polymer of a composite RO membrane under applied pressures resulting in losses to permselectivity.

A critical relationship has been found to exist between the particular SP and porous substrate combination and the resultant composite membrane performance. It has been found that membranes made from porous polymer supports containing substantially only ether and sulfone linkages have consistently lower flux and higher salt rejection (are "tighter") than ones made from porous supports containing additional alkyl linkages. Whether this is due to pore size differences, surface energy differences (and thus wetability), or other phenomena between the more hydrophilic ether-sulfone and the less hydrophilic alkyl-ether-sulfone types of aromatic porous substrate polymers isn't known at this time. Nevertheless, an important empirical relationship has been uncovered and put to use in this invention by combining the appropriate SP and porous substrate polymer to yield the best thin film composite membranes and coated UF and MF membranes.

The above mentioned porous substrates useful by this invention may be in flat sheet form with or without an additional porous polymeric supportive sheet (such as those carrier fabrics commonly used as moving webs in the flatsheet RO or UF membrane industry), in hollow fiber form, or in tubular form.

Spiral wound flatsheet, ordinary flatsheet, hollow fiber, or tubular modules prepared from thin film composite membranes of this invention are useful for separations by reverse osmosis, microfiltration and ultrafiltration. Utility of these membranes includes both purification of water through removal of salts, organic compounds, viruses, bacteria, colloidal substances, sediments, etc. as well as recovery or concentration of valuable substances pertaining to dairy, fermentation, paper & pulp, fruit juice, electroplating, mining, pharmaceutical, electronics, painting and chemical industries. Particularly advantageous is the utilization of the above membranes for separation processes in which high tolerance to oxidizing agents such as chlorine and/or extremes of pH are desired.

The following Examples serve to further illustrate the invention but should not be construed as in anyway limiting the broader aspects thereof.

EXAMPLE 1

An 18% (by weight) solution of polysulfone having the following structure:

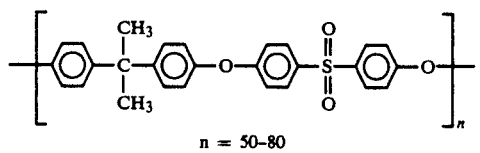

n = 50-80

(available as Udel P3500, Union Carbide) in 75% N,N'-dimethyl formamide and 7% bis-(2-methoxyethyl) ether was cast on a paper-like porous sheet then gelled in a water bath to produce a porous substrate. This porous substrate was subsequently dried at 105° C. for 5 minutes and brush coated evenly with a 0.25% (wt. vol.) solution of sulfonated polyarylether (hereinafter SP) having the following structure:

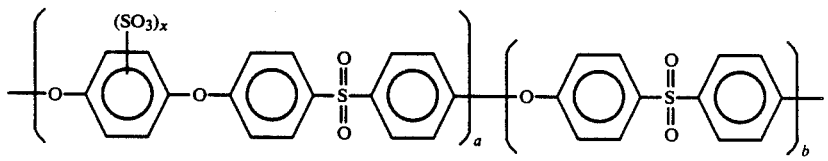

(formula I-5 above, available as 1:5 sulfonated Victrex - ICI Americas, IEC=1.29. meq/gm. sodium salt form) containing 0.14% lithium chloride in formic acid (90% solution). After forced air drying at 55° C. for 3 minutes, samples of this membrane were tested for reverse osmosis properties on a 2000 ppm, pH8 sodium chloride feed at 200 psig (NDP). The performance after 1 hour for a mean of 6 samples was: 16.8 GFD flux and 96.7% salt rejection.

EXAMPLE 2

A porous substrate was prepared and coated as in Example 1, except 0.75% SP-containing solution with no additives was used in a solvent mixture of 80% 2-methoxyethanol/20% formic acid. After the same drying treatment as Example 1, 3 samples were tested on a 5000 ppm, pH6 sodium chloride feed at 343 psig NDP for 1-hour and gave a mean performance of 27.5 GFD flux and 89.4% salt rejection.

EXAMPLE 3

A 21% (by weight) solution of polyimide (UpJohn 2080) was formulated as described in U.S. Pat. No. 4,307,135, cast on a paper like porous polymer sheet, then gelled in a water bath to produce a porous substrate. After saturating this substrate in a 20% solution of glycerine in methanol for 8 minutes, this substrate was coated and dried as in Example 1. Testing on a pH8, 2000 ppm sodium chloride feed at 377 psig NDP gave 15.7 GFD flux and 99.5% salt rejection after 1 hour (mean of 2 samples).

EXAMPLE 4

A porous support was prepared as in Example 1 except that a compound having the following structure

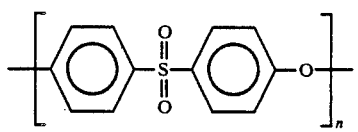

(available as Victrex polyethersulfone, 300P ICI Americas) was used for the support. When coated and tested as in Example 1, resultant membrane performance was 6.5 GFD flux and 98.0% salt rejection (mean of 4 samples).

EXAMPLE 5

A porous support was prepared as in Example 1 except that a compound having the following structure

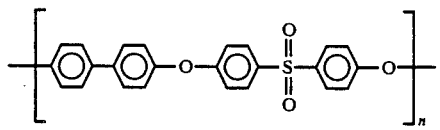

available as Radel ® polyphenylsulfone (A-400, Union Carbide) was used. When coated and tested as in Example 1, resultant membrane performance was 4.8 GFD flux and 97.6% salt rejection (mean of 3 samples).

EXAMPLE 6

A porous support was prepared as in Example 1 except that a mixture of 90% of the polysulfone having the following structure

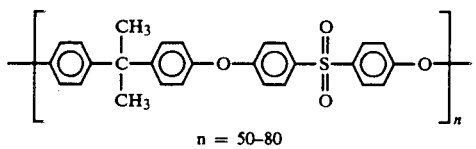

n = 50–80

(available as Udel polysulfone) to 10% of the compound having the following structure

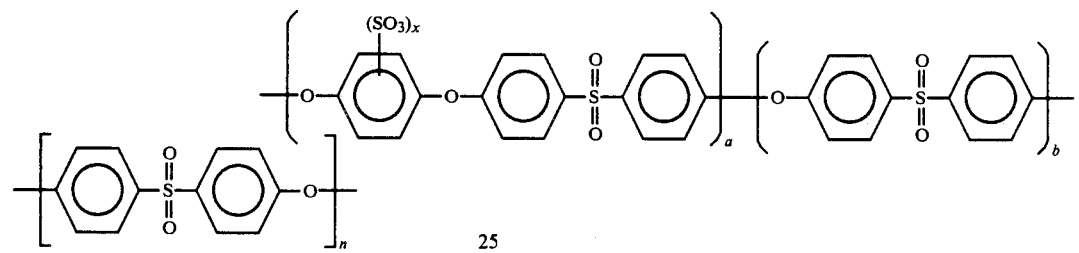

(available as Victrex polyethersulfone) was used. This substrate was coated and tested as in Example 1 except that 377 psig NDP was used in testing. Membrane performance after 1-hour was 23.8 GFD flux and 98.0% salt rejection (mean of 4 samples).

EXAMPLE 7

A membrane was prepared as in Example 1 except that a compound having the following structure

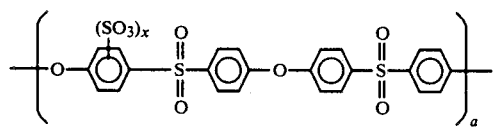

(formula I-1, above, IEC=approximately 1.0 meq./gm., sodium salt form) was used in conjunction with 0.07% lithium chloride. Membrane performance, when tested as in Example 1, was 13.6 GFD flux and 96.6% salt rejection (mean of 3 samples).

EXAMPLE 8

A membrane was prepared and tested as in Example 7 except that the porous substrate used was that in Example 4. Membrane performance was 6.0 GFD flux and 97.9% salt rejection (mean of 4 samples).

EXAMPLE 9

A membrane was prepared and tested as in Example 1 except that a compound having the following structure

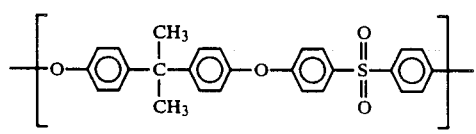

formula I-2 SP, above, IEC-0.86 meq./gm., sodium salt form) was used and at a concentration of 0.5%. Membrane performance was 17.4 GFD flux and 90.8% salt rejection (mean of 3 samples).

EXAMPLE 10

A membrane was prepared and tested as in Example 9 except the coating solution was diluted in half and the porous substrate of Example 4 was used. Membrane performance was 19.5 GFD flux and 93.9% salt rejection (mean of 2 samples).

EXAMPLE 11

A membrane was prepared and tested as in Example 1 except that a solution of a compound having the following structure (0.5% of formula I-4 SP, above, IEC=1.9 meq./gm., sodium salt form) without additive was used. Membrane performance was 234 GFD flux and 20% salt rejection (mean of 3 samples).

EXAMPLE 12

A membrane was prepared and tested as in Example 11 except that the IEC was 1.29 meq./gm; and the porous substrate used was that of Example 4. Membrane performance was 8.1 GFD flux and 93.4% salt rejection (mean of 2 samples).

EXAMPLE 13

A membrane was prepared and tested as in Example 13 except that 0.28% lithium chloride was included in the coating solution. Membrane performance was 60.1 GFD flux and 59.4% salt rejection (mean of 2 samples).

EXAMPLE 14

A membrane was prepared and tested as in Example 12 except that the coating solution was diluted in half and the porous substrate was that used in Example 5. Membrane performance was 7.6 GFD and 93.7% salt rejection (mean of 2 samples).

EXAMPLE 15

A membrane was prepared and tested as in Example 11 except that the coating solution contained a compound having the following structure

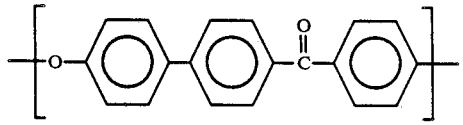

(formula II-I, above, available as (PEEK ® 450P, ICI Americas, IEC unknown, sodium salt form without additive). Membrane performance was 15.3 GFD flux and 92.8% salt rejection (mean of 2 samples).

EXAMPLE 16

A membrane was prepared and tested as in Example 11 except that a compound having the following structure

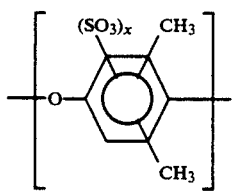

(formula III-1 SP, above IEC unknown, free acid form) was used. Membrane performance for this case was 17.1 GFD flux and 90.5% salt rejection (mean of 2 samples).

EXAMPLE 17

A porous polysulfone substrate prepared as in Example 1 was coated on a continuous processing machine by spraying a 0.22% by wt. solution of sulfonated polyethersulfone (IEC=1.36 meq./gm.) in 90:10 formic acid:water containing 0.2% lithium chloride. This coating solution, which was applied at a loading of 13 g/ft$^2$ was evaporated in a forced air oven initially at 70° C. for a period of 35 seconds then at 80° C. for 2.5 minutes to yield a composite membrane. Samples of this membrane when tested on a 2200 ppm sodium chloride feed (pH 8.2) at 200 psig NDP yielded 14.9 GFD flux and 97.0% rejection after 24 hours.

EXAMPLE 23

Demonstration of reverse osmosis membrane performance stability on test with and without added 6 ppm active chlorine at pH 8.2 has been carried out using two inch spiral-wound elements of membrane (4 ft$^2$ area) made by a continuous machine, based on the fabrication method of Example 1. After 420 hours of equilibration testing on natural pH 8.2 San Diego tapwater (600 ppm total dissolved solids-"TDS") at 200 psig NDP, performance was 7.5 GFD flux and 97.5% rejection (TDS). After this point, 6 ppm average free chlorine was introduced and kept at this level while maintaining all of the original test conditions for a period of 550 hours. Flux and rejection performance remained virtually unchanged at 7.4 GFD flux and 98.1% rejection. Not only has stability on a live feed been demonstrated, but also excellent tolerance to a commonly used water disinfection chemical-chlorine.

EXAMPLE 19

Another two-inch spiral wound membrane element very similar to that described in Example 18 was RO tested on a pH 8.3 live San Diego tapwater feed containing 670 ppm TDS, at 392 psig NDP. Equilibrated performance on this feed consisted of 15.1 GFD flux and 98.1% rejection. This membrane element was then subjected to a variety of aggressive aqueous cleaning agents, many of which are used in actual RO membrane applications. Table 2 below lists the sequence of stepwise closed-loop recirculations of the various chemical agents. After all of these treatments, many of which would be too harsh for other commercially important membranes, including cellulose acetates, polyetherureas, and polyamides, the tested membrane element yielded virtually the original performance, that is, 18.4 GFD flux and 98.0% rejection

TABLE 2

| Acent | Concentration | pH | Time Recirculated (Hours) |
|---|---|---|---|
| Sodium Hydroxide and Sodium Chloride | 0.1 N | 12.8 | 1 |
| Citric Acid | 1% | 2.4 | 2.3 |
| Urea | 30% | 8.2 | 4.1 |
| Sodium dodecyl sulfate | 1000 ppm | 7.5 | 1.6 |
| Sodium hypochlorite | 115 ppm | 9.1 | 1.5 |
| Sodium bisulfite | 1000 ppm | 4.5 | 3.1 |
| Oxalic Acid | 1% | 1.8 | 1 |
| EDTA and sodium tripolyphosphate | 1% | 9.8 | 1 |

In ultrafiltration applications, one very common membrane form for industrial and laboratory uses is the hollow fiber. Hollow fiber membranes are mounted, usually in cartridges, with the open ends of the fibers potted at each end in an adhesive plug sealed to the cylindrical cartridge walls at either end thereof. The membrane barrier layer or "skin" is usually on the inside of the hollow fiber or "lumen". The process feed usually enters one end of the hollow fiber and a concentrated solution exits at the other end. Permeate, i.e., the liquid which passes through the membrane normally exits the cartridge from one or more ports in the cartridge shell.

To demonstrate the effects of coating ultrafiltration membranes with a sulfonated polyarylether sulfone polymer, industrial grade membranes in cartridge form were treated. The fiber types which were coated included polysulfone ultrafiltration products having molecular weight cut-offs ranging from 1,000 to 100,000 and with fiber internal diameters from 0.02 inches to 0.06 inches. Among the polymers used for the substrate fibers were Udel ® and Radel ® (Union Carbide Corp.) and Victrex (ICI) (whose structures are given below).

To coat the hollow fibers, the cartridge containing the potted membranes was clamped vertically and the coating solution was applied to the interior of the fibers only. The polymer solution was held in contact with the membrane surface for a short period usually about 15 seconds, and then allowed to drain. After the hollow fiber was coated with the polymer solution, the cartridge was placed on a curing fixture where heated dry air was forced through the lumen of the fibers. Heated air can also be blown onto the exterior of the fibers. The curing parameters which can be varied are air temperature, air flow rate and drying time. The temperature of the heated air in the fiber lumen can range from 30° C. to 100° C., although 48°-58° C. is preferable. The air flow rate can range from 0.25 CFM to 12 CFM and is highly dependent on air temperature and time.

The following specific examples serve to teach the formation of coatings or films on commercially available hollow fiber membranes to produce UF, MF or low pressure RO membranes. The SP's were prepared by processes either illustrated above or otherwise well known to the art heretofore. A common method of sulfonation of polysulfones may be found in Coplan U.S. Pat. No. 4,413,106, issued Nov. 1, 1983.

EXAMPLE 20

A reverse osmosis membrane was formed on the internal surface of a dried hollow fiber support using a sulfonated polysulfone polymer having an IEC of 1.29-1.4 meq./gm. This was accomplished by exposing the interior of the support fiber to a solution containing 0.50% of the sulfonated polymer, 0.56% LiCl, and 99.36% formic acid for 30 seconds. Heated, dry air was thereafter passed through the lumen of the fibers at 50° C. and a flow rate of 0.17 CFM for 10 minutes. The performance of this composite membrane was 15 GFD flux and 75% salt rejection when tested on a feed of 5000 ppm NaCl and 240 psi NDP.

EXAMPLE 21

A reverse osmosis membrane was formed following the same procedure described in Example 20 except that a wet support was used. The performance of this composite membrane at the same test conditions was 200 GFD flux and salt rejection.

EXAMPLE 22

Ultrafiltration hollow fiber membrane substrates with various pore sizes (molecular weight cut off "MWCO") were coated with the sulfonated polyethersulfone described in Example 20 to yield ultrafiltration membranes with lower MWCO than the substrate fiber. The resulting test data are shown below in Table 3.

EXAMPLE 23

Coated membranes were prepared using the same procedure as Example 20 except the support was partially wet. A reverse osmosis membrane coating was formed using this polymer. The performance of this composite membrane at the same test conditions as Example 20 was 80 GFD flux and 50% salt rejection.

EXAMPLE 24

A reverse osmosis membrane was formed using the same procedure described in Example 20 except the cure time was increased to 20 minutes. The performance of this composite membrane at the same test conditions as Example 20 was 9 GFD flux and 81% salt rejection.

Several common proprietary commercial grades of polyarylether polymers useful by the present invention are illustrated by the following formulae:

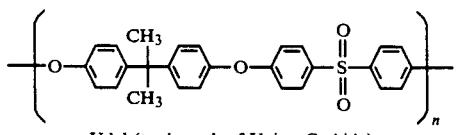

Udel (trademark of Union Carbide)

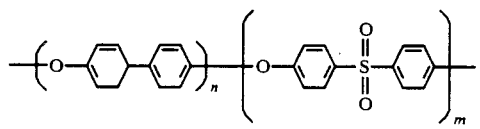

Radel (trademark of Union Carbide)

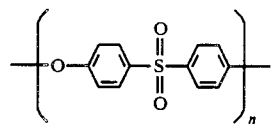

Victrex (trademark of I.C.I.)

Polyarylether polymers of the above types were sulfonated and used to coat various UF membrane substrates. A summary of the performance data from a large number of individual tests using Victrex 600 P as the coating polymer on a Udel polysulfone UF membrane substrate are presented below in Table 3. The composition of the coating solution formulation which was primarily used was:

TABLE 3

| | Polysulfone Hollow Fiber Membrane (Udel) Performance Data (25 p.s.i.g.) Before and After Being Coated with Sulfonated Polyethersulfone (Victrex 600P) to Form Coated UF Membrane | | | | | |
|---|---|---|---|---|---|---|
| | BEFORE COATING DEXTRAN 5000 | | | AFTER COATING DEXTRAN 5000 | | |
| POLYSULFONE SUBSTRATE (MW CUTOFF) | WATER FLUX (GFD) | SOLUTION FLUX (GFD) | REJECTION (%) | WATER FLUX (GFD) | SOLUTION FLUX (GFD) | REJECTION (%) |
| 2,000 | 46.3 | 38.0 | 46.0 | 12.7 | 10.5 | 80.2 |
| 10,000* | 102.4 | 95.5 | 22.2 | 44.3 | 39.1 | 73.5 |
| 10,000 | 140.0 | 107.2 | 28.2 | 63.6 | 59.5 | 64.2 |
| 30,000 | 88.2 | 77.8 | 38.6 | 73.5 | 61.4 | 58.2 |
| 50,000 | 86.5 | 74.4 | 25.5 | 93.4 | 77.8 | 48.1 |
| 100,000 | 239.0 | 170.0 | 9.1 | 275.0 | 180.0 | 13.3 |

*cationic polyelectrolyte coated

The above Table shows the flux and rejection of the base polysulfone UF hollow fiber membranes before and after being coated with sulfonated polyarylether sulfone to form the coated UF membrane. These data illustrate that in every case the coated fiber or membrane exhibits a lower molecular weight cutoff (tighter membrane) than the base UF polysulfone membrane by virtue of the linear polysaccharide Dextran 5000 molecule rejection data. The coated UF membrane exhibits higher rejection data for the Dextran 5000 molecule than the uncoated or base polysulfone UF membrane. These data also establish one of the primary advantages of this invention. For example, an original 50,000 MW cutoff membrane can be converted into a modified membrane that exhibits a lower molecular weight cutoff (% rejection) and higher flux (both water and solution) than a corresponding uncoated 2,000 MW UF membrane (see data of Table 3, above). Second, the coated UF membrane of this invention would also possess a higher degree of hydrophilicity than the base polysulfone UF membrane made from Udel polymer.

Another approach that can be used to control the molecular weight cutoff of the UF membrane is to modify the coating curing procedure. Table 4 below, shows how the same base UF polysulfone hollow fiber membrane that is coated with a sulfonated polyarylether sulfone can produce a series of coated UF membranes with a range of molecular weight cutoffs by merely modifying the coating curing procedure. The advantage of this technical approach is that the exact membrane rejection characteristics can be tailored to a specific application.

TABLE 4

Sulfonated Polyethersulfone (Victrex 600) Coating Curing Time On the Performance Data of UF Coated Membrane (25 p.s.i.g.)

| CURING TIME (MIN) | WATER FLUX (GFD) | DEXTRAN 5000 | |
|---|---|---|---|
| | | FLUX (GFD) | REJECTION (%) |
| 0* | 105.5 | 84.7 | 15.6 |
| 5 | 127.1 | 100.3 | 29.1 |
| 10 | 128.0 | 96.8 | 28.8 |
| 15 | 76.1 | 57.1 | 58.0 |
| 30 | 51.9 | 39.8 | 68.3 |
| 10 (+18 hrs. at 50° C.) | 38.0 | 31.1 | 76.4 |
| 10 (minutes of air flow in each direction - 20 minute total) | 98.6 | 76.1 | 36.9 |

*substrate of Udel polysulfone UF membrane

The UF coated membranes of this invention that are prepared by the methods discussed above exhibit the following advantages:
(1) the coated membranes are more hydrophilic than the base UF polysulfone membrane.
(2) the coated membranes are strongly negatively charged.
(3) the SO$_3$H moiety is highly reactive and can be easily converted to chemical moieties that are neutral or positively charged.

In addition to the improvements in flux and molecular weight cutoff shown above the coated membranes of the invention perform differently than uncoated polysulfone UF membranes with comparable molecular weight cutoff specifications. The data in Table 5 below show how a standard polysulfone membrane (Udel) with a 2000 molecular weight cutoff exhibits lower flux and solute rejections than a coated UF membrane with an equivalent molecular weight cutoff. The rejection of the 2000 MW membrane appears to be determined by molecular size in both cases, while the rejection of the coated membrane appear dependent on a chemical interaction between the membrane surface and the feed solute, as may be derived from the following Table:

TABLE 5

Membrane Performance Data Comparison of a 2000 MW UF Membrane vs. a Coated UF Membrane (25 p.s.i.g.)

| | WATER | DEXTRAN (2)5000 | | BACITRACIN(3) | |
|---|---|---|---|---|---|
| | FLUX (GFD) | FLUX (GFD) | REJECTION (%) | FLUX (GFD) | REJECTION (%) |
| 2000 MW (Udel) | 30.1 | 24.8 | 76.5 | 7.6 | 50.3 |
| Coated Membrane (1) | 47.7 | 37.0 | 73.9 | 1.7 | 76.7 |

(1)50,000 MW UF membrane (Udel polysulfone) coated with sulfonated polyethersulfone (sulfonated Victrex 600).
(2)Dextran 5000 is a linear polysaccharide with a molecular weight of 5000.
(3)Bacitracin is a flobular protein with a molecular weight of 1400.

In application tests of the sulfonated polysulfone-coated membranes, the surface effect of coating a relatively hydrophobic polysulfone or similar substrate UF membrane can alter the filtration characteristics dramatically. For example, uncoated commercial grade of polysulfone and polyamide UF membranes were severely fouled by a fermentation broth containing an alkaline protease and a defoamer. Surprisingly, a coated (sulfonated Victrex polymer on a Udel substrate) UF membrane of the invention showed a significantly higher flux and much less flux decay when treating the same alkaline protease fermentation broth. Table 6 below compares the performance of coated membranes of the invention with standard industrial grade membranes on the concentration of rennen.

TABLE 6

Evaluation of Sulfonated Polyethersulfone (Victrex 600) Coated UF Membranes vs. Uncoated Membranes on Clarified Broth - Microbial Rennen (25 p.s.i.g.)

| MEMBRANE TYPE | FLUX (GFD) | PERMEATE REJECTION UNITS |
|---|---|---|
| Coated Udel membrane (2,000 MW) | 6 | <100 |
| Coated Udel membrane (10,000 MW) | 6 | <100 |
| Uncoated 5,000 MW Udel | 9 | 100 |
| Uncoated 10,000 MW Udel | 12 | 200 |
| Coated Udel 50,000 MW substrate | 12 | 300-600 |
| Coated Udel 10,000 MW substrate | 12 | 1100 |

In summary, the application of a sulfonated polyarylether sulfone coating to a UF membrane (substrate) has been found to provide the following advantages:
(a) Increased hydrophilicity—the —SO$_3$H moieties in the ultrathin coating significantly increases the hydrophilicy of the membrane surface, whereas unmodified polysulfone (and similar composition) UF membranes are relatively hydrophobic; and, therefore, are more prone to fouling when exposed to oleophilic materials.
(b) Charged Surface—the —SO$_3$H moieties impart a strong negative charge to the membrane surface and reduce normal membrane fouling tendencies since most colloidal materials are negatively charged and the SO$_3$H groups will electrically repel them to keep the membrane surface clean.
(c) Chemical reactivity—since the SO$_3$H moiety is extremely reactive this moiety can be easily converted to other chemical moieties that will impart either neutral or cationic character to the membrane surface.
(d) Pore size control—the pore size distribution of the UF composite membrane can be regulated very closely by controlling either the key parameters of the process, coating composition and curing cycle, or the porosity of the UF membrane substrate.

We claim:

1. An improved oxidatively resistant membrane consisting essentially of an oxidatively resistant porous substrate to which is bonded a coating film of a sulfonated polyarylether polymer and which membrane is prepared by a process which comprises:
(a) forming a solution of a sulfonated polyarylether polymer in a potentiating solvent system containing at least 10% formic acid, said solvent system being substantially polar, volatile enough to be removed by gentle heating, of low enough surface tension to wet the porous substrate, and not able to dissolve the porous substrate;

(b) uniformly applying said solution of the sulfonated polyarylether to at least one surface of the porous substrate; and (c) removing said solvent from the solution to form a coating or film of the sulfonated polyarylether adherently attached to the porous substrate.

2. The membrane of claim 1 wherein the potentiating solvent system comprises:

(a) at least 20% to 100% formic acid;
(b) from 0% to 80% of a solution consisting essentially of
  (i) water and
  (ii) alkali metal salts.

3. The membrane of claim 2, wherein said potentiating solvent system contains minor amounts of alkali metal salts.

4. The membrane of claim 1 wherein the potentiating solvent system comprises at least 20% formic acid with the remainder of the solvent selected from the group consisting of an alcohol, alkylene diol or triol and an alkylene glycol alkyl ether.

5. The membrane of claim 1 wherein the potentiating solvent system comprises a lithium salt in an amount below about 2.0% by weight of the potentiating solvent system.

6. The membrane of claim 1 wherein the porous substrate is an anisotropic polymeric membrane comprising a polymer selected from the group consisting of polyarylether sulfones, polyarylether ketones, polyphenylene ethers, polyphenylene thioethers, polyimides, polyetherimides, polybenzimidazoles, polyesters, polyvinylidene fluoride, polychloroethers, polycarbonates, polystyrene, polyvinylchlorides, and polyacrylonitrile and various copolymers thereof.

7. The membrane of claim 1 wherein the porous substrate is an anisotropic polyarylether sulfone membrane.

8. The membrane of claim 1 fabricated for reverse osmosis applications wherein the thin coating or film of sulfonated polyarylether sulfone is capable of rejecting sodium chloride from a 3000 ppm aqueous solution thereof at a rate of at least 95% at 400 psig and yielding a flux of at least 15 GFD.

9. The membrane of claim 8 in the form of a spiral wound element or module.

10. The membrane of claim 1 fabricated for low pressure reverse osmosis or ultrafiltration applications wherein the porous substrate is an anisotropic polysulfone or polyethersulfone polymeric membrane.

11. The membrane of claim 10 in the form of a hollow fiber or tube module.

12. The membrane of claim 1 wherein the sulfonated polyarylether coating or film has an IEC of between about 0.2 and 2.0 milliequivalents/gm.

13. The membrane of claim 1 wherein the thin polymeric coating or film comprises a sulfonated polyarylether sulfone of the formula:

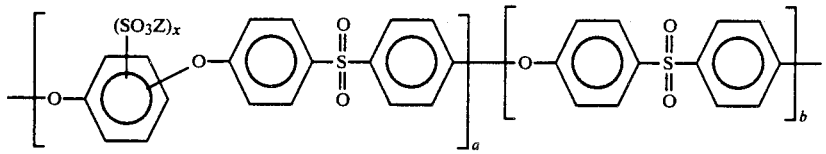

wherein Z is hydrogen, an alkali metal, or nitrogen containing species derived from ammonia or amines, the b/a ratio is from 0 to 20 and x is an average number such as to give an IEC for the sulfonated polymer of between 0.2 and 2.0 meq./gm.

14. The membrane of claim 1 wherein the thin polymeric coating or film comprises a sulfonated polyarylether sulfone of the formula:

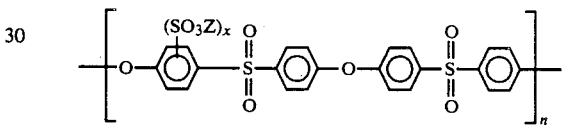

wherein Z is hydrogen, an alkali metal or nitrogen containing species derived from ammonia or amines and x is an average number such as to give an IEC for the sulfonated polyarylether sulfone polymer of between 0.2 and 2.0 meq./gm.

15. The membrane of claim 1 wherein the thin polymeric coating or film comprises a sulfonated polyarylether ketone of the formula:

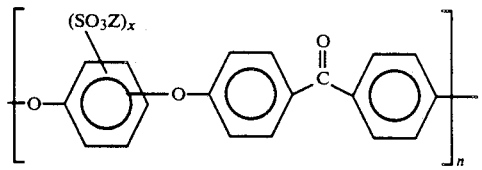

wherein Z is hydrogen, an alkali metal, or nitrogen containing species derived from ammonia or amines and x is an average number such as to give an IEC for the sulfonated polyarylether ketone polymer of between 0.2 and 2.0 meq./gm.

16. The membrane of claim 1, wherein said potentiating solvent system is capable of swelling the porous substrate.

* * * * *

UNITED STATES PATENT AND TRADEMARK OFFICE
CERTIFICATE OF CORRECTION

PATENT NO. : 4,990,252

DATED : February 5, 1991

INVENTOR(S) : John Edward Tomaschke et al

It is certified that error appears in the above-identified patent and that said Letters Patent is hereby corrected as shown below:

Column 10, line 1, delete "hydropbobic" and insert --hydrophobic--;

Column 11, line 1 (top of Table 1-continued), above "Sulfonated Polyarylether" insert --Non-Solvents for--;

Column 16, Example 13, line 43, delete "13" and insert --12--;

Column 16, Example 15, delete the chemical formula and replace it with the following corrected formula:

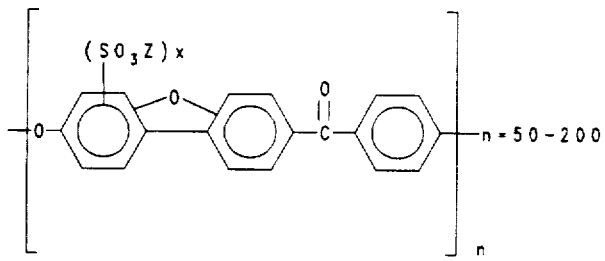

Signed and Sealed this

Fourth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 4,990,252
DATED : February 5, 1991
INVENTOR(S) : John Tomashke et al.

It is certified that error appears in the above-identified patent and that said Letters Patent is hereby corrected as shown below:

On the Title Page:

Item [73] change "Hydanautics" to --Hydranautics--.

Signed and Sealed this

Tenth Day of April, 2001

Attest:

NICHOLAS P. GODICI

Attesting Officer

Acting Director of the United States Patent and Trademark Office